Patented Oct. 27, 1953

2,657,213

UNITED STATES PATENT OFFICE 2,657,213

PROCESS OF MANUFACTURING PHTHALOCYANINES

Mitchell Dudnikov, Elizabeth, N. J., assignor to American Cyanamid Company, New York, N. Y., a corporation of Maine No Drawing. Application November 3, 1951, Serial No. 254,807

9 Claims. (Cl. 260—314.5)

This invention relates to an improvement in the manufacture of phthalocyanines.

A series of valuable blue to green pigments of the phthalocyanine series which contain a metal atom such as copper, nickel, iron, etc. have been prepared by a number of processes. One of the processes involves reaction between phthalic anhydride, urea, and a salt of the metal to be introduced. This process, which has the advantage that it starts from cheap raw material has presented some operating problems by reason of the fact that various constituents were fused. Attempts have been made in the past to improve the operating characteristics of the process by carrying it out in a high-boiling organic diluent of which trichlorobenzene is typical. The solvent is inert, and so long as the boiling point is sufficiently high, 200° C. or higher, the particular solvent is unimportant. Because of its low cost, trichlorobenzene is the one which has been chosen. Other typical high-boiling inert diluents are the following: amylbenzene, mixed bromoxylene, tetra and pentachlorobenzene and high-boiling paraffins. Nitrocompounds exert an oxidizing effect, and the various nitrobenzenes are therefore unsuitable as they are not inert.

The use of a high-boiling solvent solved mechanical operating problems such as stirring, heat transfer, and the like, but there remained another serious drawback. Phthalic anhydride has a very flat vapor pressure-temperature curve and tends to sublime out of the reaction mixture at temperatures far below its boiling point. When reflux condensers are used, as is common, the sublimed phthalic anhydride presents a considerable probelm. If the condensers are of ordinary design, serious plugging results. Even if special equipment with very wide openings is used, there still is a loss of phthalic anhydride which adversely affects the yield and adds to the cost of operation.

According to the present invention we have found that by incorporating in the reaction mixture a minor proportion of an inert organic liquid boiling below 150° C., all of the disadvantages of the prior processes are avoided. The ease of operation with a high-boiling solvent as the main liquid constituent of the reaction mixture is retained in full, while the small amount of inert organic liquid which is constantly boiling is condensed in the reflux condenser, forms a film on the walls, and washes down the phthalic anhydride which sublimes on the condenser walls. No plugging takes place, no phthalic anhydride is wasted, and the reaction proceeds smoothly and reliably without requiring any close supervision.

The nature of the low-boiling solvent is not critical. It is only necessary that it be inert, which rules out nitrocompounds, that it should not boil materially higher than 150° C., and that it should not have too low a boiling point so that a serious problem in reflux condenser design would be introduced. In general, it is preferable to use a liquid which does not involve a serious fire hazard. In other words, if the liquid is inflammable it should not have too low a boiling point. Thus, for example, diethyl ether is not a suitable solvent because it combines a very low boiling point with a high degree of inflammability. On the other hand, a low-boiling, non-inflammable solvent such as carbon tetrachloride can be used and solvents which are capable of burning but have a higher boiling point such as benzene, toluene, xylenes, ethylbenzene, diisobutyl ether, diethyl ketone, ethyl butyrate, and the like may be used. I prefer to use a solvent which has both an ordinary elevated boiling point and low inflammability. One of the best is monochlorobenzene which is both effective and cheap and is therefore the preferred solvent. Illustrations of other solvents which are suitable are pyridine, acetylene tetrachloride and N-methylmorpholine.

The amount of the lower-boiling liquid is likewise not critical and will depend on the heating cycle and the particular apparatus used. In general, the lower limit is that which will satisfactorily wash down condensed phthalic anhydride in the reflux condenser. The upper limit is that at which the heat loss from boiling excessive amounts of solvent becomes a serious manufacturing charge. In general, with most solvents, good results are obtained with from 8 to 15% of low-boiling solvent based on the volume of high-boiling solvent used.

It is an advantage of the present invention that not only are excellent yields possible because losses of phthalic anhydride are eliminated, but at the same time a product of excellent quality is obtained. In this respect the present invention is fortunate in that no compromise of yield and quality is necessary.

Recovery of solvents used presents no problem as the difference in boiling point is so great that conventional means of separation such as simple fractionation gives good results.

The invention will be further illustrated by the following examples, parts being by weight unless otherwise noted:

Example 1

A mixture of 55 parts of phthalic anhydride, 75 parts of urea, 18 parts of anhydrous cupric sulfate, 0.186 part molybdenum trioxide, 310 parts of commercial trichlorobenzene (mixed isomers), and 27 parts of chlorobenzene is heated to 205° C. under reflux until the reaction is complete. The time will vary with the size of the batch but for commercial sizes batches will vary from about 4 to 6 hours. During this operation, the steady refluxing of the chlorobenzene washes all phthalic anhydride sublimate back into the reaction mixture. The product is then cooled and filtered. It may be freed of solvents by steam stripping or washing with alcohol. It can be acid pasted in the usual way from sulfuric acid. The yield is excellent.

This example describes the results obtained with trichlorobenzene containing 8.7% of its weight, or about 12% of its volume, of monochlorobenzene. This percentage can be somewhat increased or lowered with similar results. Below 5% by volume, however, the washing action becomes too slow for fully satisfactory results, while above 15% by volume the boiling point of the mixture is lowered to the point where it interferes with the progress of the reaction.

Example 2

The procedure of Example 1 is followed, using mixed xylenes instead of the monochlorobenzene. The same high yield and excellent product is obtained.

Example 3

The procedure of Example 1 is followed, using a high-boiling paraffin fraction instead of the trichlorobenzene and diethylketone instead of the monochlorobenzene.

Example 4

The procedure of Example 2 is followed, replacing the copper sulfate with nickel sulfate, using amylbenzene as the high-boiling diluent and pyridine in place of the monochlorobenzene. The reaction proceeds smoothly and a high yield of nickel phthalocyanine is obtained.

I claim:

1. In a process of manufacturing a phthalocyanine by the reaction between phthalic anhydride, urea, and a metallic salt in the presence of an inert liquid substantially non-volatile under reaction conditions, the improvement which comprises incorporating in the reaction mixture a minor proportion of a substantially anhydrous organic liquid substantially inert under the conditions of the reaction and boiling below 150° C., said reaction being conducted under atmospheric pressure.

2. In a process of manufacturing copper phthalocyanine by the reaction between phthalic anhydride, urea, and a copper salt in the presence of an inert liquid substantially non-volatile under reaction conditions, the improvement which comprises incorporating in the reaction mixture a minor proportion of a substantially anhydrous organic liquid substantially inert under the conditions of the reaction and boiling below 150° C., said reaction being conducted under atmospheric pressure.

3. A process according to claim 2 in which the copper salt is copper sulfate.

4. A process according to claim 3 in which the organic liquid boiling below 150° C. is monochlorobenzene.

5. A process according to claim 4 in which the substantially non-volatile organic liquid is trichlorobenzene.

6. A process according to claim 5 in which the chlorobenzene is present in a volume between 10 and 15% of the volume of the trichlorobenzene.

7. A process according to claim 2 in which the organic liquid boiling below 150° C. is monochlorobenzene.

8. A process according to claim 7 in which the non-volatile organic liquid is trichlorobenzene.

9. A process according to claim 8 in which the monochlorobenzene is present in a volume between 10 and 15% of the volume of the trichlorobenzene.

MITCHELL DUDNIKOV.

References Cited in the file of this patent

UNITED STATES PATENTS

| Number    | Name  | Date          |
|-----------|-------|---------------|
| 2,302,612 | Lacey | Nov. 17, 1942 |

OTHER REFERENCES

Fiat Report 1313 (PB 85,172), Feb. 1, 1948, pp. 275, 276 and 282.